Aug. 23, 1938.   C. ALIMARAS   2,128,067
APPARATUS FOR CONTROLLING VEHICULAR TRAFFIC BY RADIO
Filed April 17, 1935
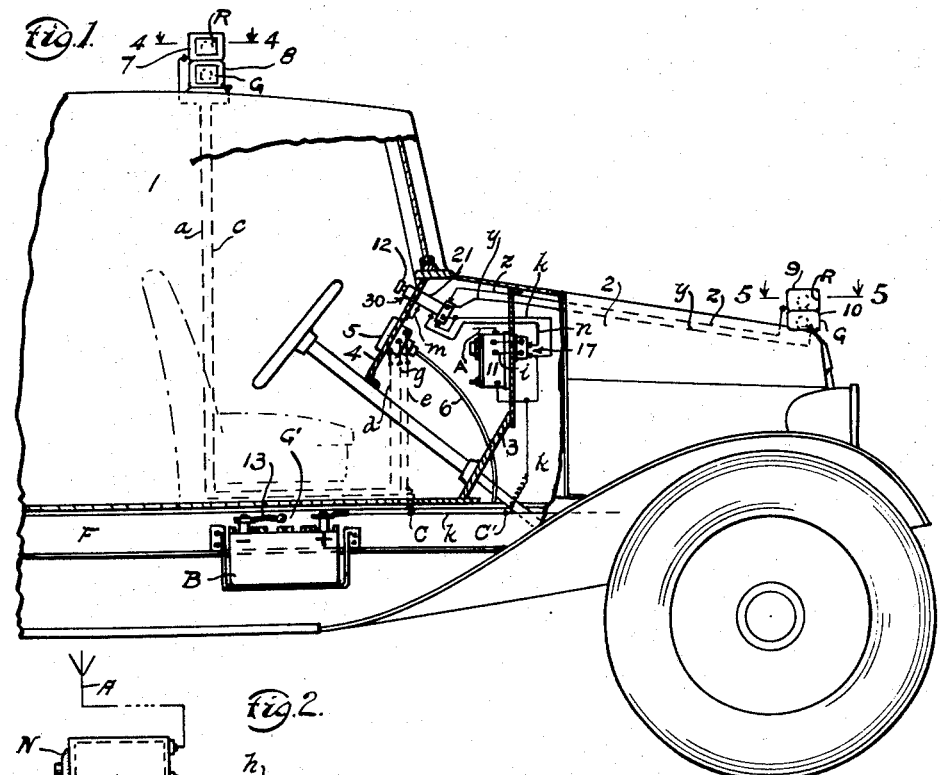
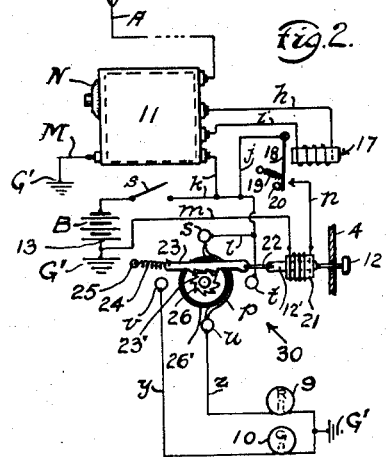
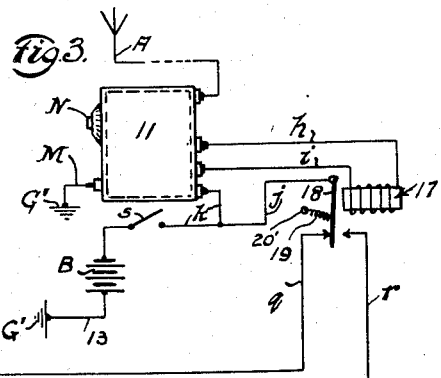
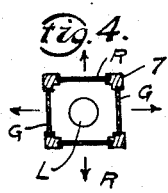
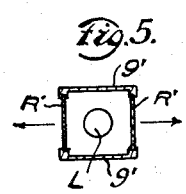
INVENTOR;
Constantine Alimaras,
BY
Harold D. Penney
ATTORNEY.

Patented Aug. 23, 1938

2,128,067

UNITED STATES PATENT OFFICE 2,128,067

APPARATUS FOR CONTROLLING VEHICULAR TRAFFIC BY RADIO

Constantine Alimaras, New York, N. Y.

Application April 17, 1935, Serial No. 16,750

1 Claim. (Cl. 177—337)

The present invention relates to an improvement in an apparatus for controlling vehicular movement, and for indicating, where necessary, and if required, visual acquiescence to such control.

While the herein application discloses the device applied to an automobile, it will be obvious that the apparatus may be applied to the control of trains or other modes of vehicular or passenger traffic.

The important feature of the present invention is in the provision of traffic control means upon a vehicle in the form of a standard radio receiver, operated by and in circuit with, in the present instance, the ignition battery, or current source, of the automobile. The vehicle is provided with radio receiver operated means whereby traffic control signal lights carried by the vehicle and in circuit with the ignition battery, or other electric current source, are controlled by the said receiver to indicate to the driver of the vehicle the "stop" and "go" periods, from a central authority, and to also indicate to others the status of the vehicle, whether in the "stop" period or the "go" period, so that cross traffic receives a vehicular warning, when the crossing is clear or when the cross traffic should stop, as will appear more in detail, later.

A further feature is in the provision of means, whereby the stopping and starting of the vehicle is indicated by an electric light circuit controlled by the actions of the vehicular speedometer.

Another feature is in the provision of manually operated means, in connection with the receiver actuated traffic circuit whereby the alternate stop and go periods may be synchronously set, manually, to alter the periodic cycle of vehicular traffic indication, such as would be encountered when a vehicle in turning right hand out of a cross street on a go period, and may be utilized to alter the sequence of vehicular traffic signals to suit the sequence of the main traffic street into which the vehicle has turned.

It will be noted, as hereinafter set out in detail, that the vehicle may have two sets of traffic indicating lights, one set indicating the supervisory control signal, sent from a central radio broadcasting station, and which signal on a suitable radio frequency and wave length, conditions the receiver actuated vehicular traffic lights on the vehicle, and a second set of lights controlled by the movement of the vehicular speedometer, which is in turn operated by vehicular movement or stoppage.

The foregoing and other features of advantage will be apprehended as the herein description proceeds, and it is obvious that modifications may be made in the structure herein, without departing from the spirit hereof or the scope of the appended claim.

The hereinafter disclosed device is intended to cooperate with a radio broadcast station, of suitable frequency and wavelength, wherein, suitable signals are broadcast intermittently, with timed silent intervals. The transmitter station may be located at a police station, and the wireless signals transmitted at predetermined intervals by a timing clock. By this means, a signal transmitting station can control and supervise the movements of vehicles within the limits of any city, regardless of its size and the numbers of automobiles in said city.

Each automobile may be equipped with the apparatus hereinafter described in detail, and thus, within understood zone limits is subject to supervised traffic movement, through signals emanating from the transmitter station.

In the drawing,

Fig. 1 is a fragmentary, partially sectioned view, in elevation, of an automobile showing the present improvement as applied to an automobile;

Fig. 2 is a diagrammatic layout of a radio wave actuated radio signal receiver;

Fig. 3 is a diagrammatic layout of a modified form of radio wave actuated radio signal receiver;

Fig. 4 is an enlarged sectional view of one of the traffic signal lights of Fig. 1, taken on line 4—4, looking in the direction of the arrows; and Fig. 5 is a similar view taken on line 5—5, Fig. 1, looking in the direction of the arrows.

One form of the present traffic control means, radio wave actuated, to set or change a vehicle carried traffic signal light system, is shown in Fig. 2, and is similar to the one shown as applied to and mounted in the vehicle of Fig. 1. It comprises a receiving antenna A, connected into an amplifying radio receiver, generally denoted by 11, which receiver is connected by wiring k into one end of the automobile ignition and lighting battery B, the other end of the amplifier radio circuit being connected to ground G' on the frame F, Figs. 1 and 2.

The battery B is also grounded to frame F, Fig. 1, as at G', by its other terminal 13, see also Fig. 2. A switch s, Fig. 2, may be provided in line k, to control the amplifier circuit of receiver 11.

A relay switch 17, connected to the receiver 11, by wiring h and i, Fig. 2, operates upon receipt of a signal in said receiver, and becomes resultantly excited, to thus attract a spring held switch 18, pivoted to wiring j, to close upon contact of wiring n, said switch being normally strained against stop pins 20 by spring 19 in open circuit position.

Upon closing of switch 18, current flows from battery B through wiring k, j, 18, n, through the winding on solenoid switch 21, and through wiring m to the opposite terminal of battery B. This circuit closing action causes the solenoid plunger 12' in solenoid 21 to move to the right, as viewed in Fig. 2, drawing with it a link connector 22, which connects solenoid 12' with a toothed rack bar 23, the other end of said rack bar 23 being stressed to the left by a coiled tension spring 24 connected between said rack bar and a fixed pin 25.

The underface of the rack bar 23 is provided as seen, in Fig. 2, with a plurality of fixed rack teeth which mesh with a toothed ratchet 26, which is affixed to a rotatable four way switch 26', which is mounted upon a central shaft 23', for stepped rotation by each stroke of the ratchet bar 23.

The four way switch is provided with a switch arm p, which is of such dimension, in length as to alternately span, during its rotation, step by step, and contact with opposed contact buttons S and u, and t and v. Contacts S and t are connected to one terminal of battery B through wiring l having two branches, as shown. Contacts u and v are connected through lamps 10 and 9 to ground G' by conductor y and z respectively.

As shown in Fig. 2, switch arm p is in circuit closing position, to connect lamp 9, shown as a red stop signal R, between battery B and ground G'.

When the radio wave or wireless signal has, on a periodical operation, actuated the amplifier 11 to operate to move switch arm p to contacts S and u, as shown in Fig. 2, the red lamp 9, mounted at the radiator cap position, Fig. 1, indicates to the driver of the automobile, of the broadcast signal to stop, for cross traffic.

After the usual period of delay the broadcast station sends another signal, and the solenoid switch operates ratchet bar 23 to pull over the switch arm p to contact with buttons t and v, respectively, thus coupling green, or "go" lamp 10G between battery B and ground G', and the driver thus starts the automobile and continues on his way until he receives another red or "stop" light signal. After receiving the "stop" signal the driver continues moving until he reaches the nearest traffic crossing, whereupon he stops his vehicle, until he again receives the green "go" signal.

As above described, it is ascertained that as the alternate traffic control signals are broadcast, at predetermined intervals, they cause the vehicle carried traffic lights to become automatically and alternately changed, and while the broadcast signal wave may be of only a few seconds duration, the signal lights 9R and 10G remain in operation during their respective, alternate operative periods.

Further, as disclosed, herein the lights 9R and 10G are so located and constructed that the lights may be viewed fore and aft, thus giving both the driver of the vehicle and the traffic coming towards him as well as the traffic policeman, a view of the controlling light. The lamp or lamp house construction for both lights 9R and 10G, as in Fig. 6 comprise, preferably, opaque side panels 9' and 9', and transparent glass panels R' and R' with a centrally located electric light L therein. In practice the lights 9R and 10G may be in superposed relation as in Fig. 1.

The structure of Fig. 2 is provided with a means for permitting of manual setting of the lights 9R and 10G, in a case where the driver backs out of his garage onto the street, throws in switch s, to set up operation of the receiver 11, and finds when he arrives at the first crossstreet that his traffic light 9R or 10G is not in synchronism with the traffic light periods. In this event, the driver pulls on hand lever 12, Fig. 2, operating the solenoid actuated latch bar 23 to set the switch arm p at its proper contacts and the mechanism is then set for continued synchronized operation with the proper periods of the broadcast traffic impulses, as received by general traffic.

A modified form of radio wave controlled circuit is shown in Fig. 3, in which many of the indices are for parts similar to those as described in Fig. 2.

In Fig. 3, A is the antenna, 11 is the radio amplifying receiver, h and i are wires connecting the relay coil 17 to the amplifying receiver, whereby, when a prolonged, timed signal is received it is translated by the radio apparatus in receiver 11 into an audio output which, in turn causes a timed current flow in the coil of relay 17, which causes relay 17 to draw pivoted switch arm 18, attached to wiring j into contact with 17, holding the same during the duration of the signal, thus straining attached coiled tension spring 19 the other end of which is fixedly attached at a fixed point 20'. This action causes conductor r to be electrically connected to switch arm 18, closing the circuit through conductor r, contact u, connection z, contact t, conductor Z, lamp 9R to ground G'. From switch arm 18, conductors j and k connect said arm to battery B. Conductor k also connects receiver 11 to battery B, the other end of this receiver circuit being grounded at G', by conductor M. The opposite end of battery B is also grounded by conductor 13 to ground G'. Conductor k is controlled by manual switch s to cut receiver 11 into and out of connection with battery B. Upon cessation of the signal the spring returns arm 18 back to close with the contact of conductor 9.

As described, the circuit of Fig. 3, under normal operative conditions, when a timed, prolonged impulse is received, causes switch arm 18 to close the operative circuit to cause the lamp 9R to become illuminated during the stop period. Cessation of the impulse causes the switch arm 18 to become released from relay 17, upon which release, the switch arm 18 is returned to the position shown under stress of the spring 19. This causes the arm 18 to close with contact on conductor q, and closes the circuit to ground G' through lamp 10G, to illuminate the same, through conductor q, contact S, connector x, contact v, conductor y and lamp 10G and to ground G', thus automatically holding the "go" lamp 10G illuminated through the "go" period. In this circuit, therefore, one received, timed radio impulse operates to close a circuit to operate one light and a subsequent sequential cessation of the timed impulse operates to open said closed circuit to permit automatic closure of a second light circuit, and in this respect the circuit of Fig. 3 while obtaining the desired lamp control, accomplishes this result in a slightly different manner than the result is accomplished by the circuit of Fig. 2, in which each short, successive impulse causes an alternate positive lamp circuit closing and simultaneous circuit opening action, the alternate periods of operation of which are not controlled by the prolongation of the broadcast impulse waves.

In Fig. 3, the contacts S, v, u and t, and the arms x and z with the central knob w are in the form of a four way switch generally denoted by 31, the contacts S, v. u and t being relatively fixed and the knob w and its attached arms x and z forming a unitary, rotatable switch member, which, like manually operated hand lever 12 of Fig. 2, may be rotatively operated to manually synchronize the signal light sequence of the vehicle to be in accord with the broadcast radio "go" and "stop" signal sequences, thereby to be in unison with the traffic control of the broadcast transmitter, thus changing the contact positions of the switch with contacts S, v, u and t.

In Fig. 1 the lamps 8G and 7R are shown operatively mounted upon the roof of the vehicle, to be thus easily visible to other traffic. As shown the "stop" or red lamp 7R is superposed upon the "go" or green lamp 8G, and each lamp may be provided, as in Fig. 5, with a light bulb L, and is provided with colored glass walls, R for red and G for green, mounted in frame 7, so that, when the vehicle is at a standstill, with the needle in contact with button contact 14, Fig. 4, the lower lamp 8G shows green lights on both sides of said lamp, with red lights fore and aft, thus signalling to cross traffic a "go" or green signal, and showing stop or red lights to through traffic, both in the rear and front of the vehicle.

Conversely, when the vehicle receives a radio impulse to "go", movement of the vehicle causes the speedometer needle to leave contact 14, and to move onto the circular contact 16. This action cuts out the lower light 8G, and connects in the upper "go" light, which as in Fig. 5, has fore and aft green light glass panes G—G, and red side light glass panes R—R.

As thus described, when the vehicle is moving, the top running light shows a stop or red light to cross traffic, and green to through traffic, both to the front and rear of the vehicle, thus indicating to cross traffic that it should stop and to through traffic the "go" signal. In this manner the two systems, the radio control signals and the sequentially operated, running, "acquiescence" lights tend to coordinate the movement of traffic in an orderly manner.

Having thus described the invention what is claimed is:

A device on a vehicle traversing highways, responsive to periodically transmitted wireless signals spaced to determine stop and go signaling periods, comprising a radio receiver, a stop and go signaling means, a step by step circuit closer, means for operating said stop and go signals individually by said circuit closer in alternate steps thereof, means responsive to a received wireless signal to move said circuit closer from one step to another, and manual means for operating said circuit closer one step whereby the signal operated by said circuit closer may be made to correspond with the proper display of said signals.

CONSTANTINE ALIMARAS.